UNITED STATES PATENT OFFICE.

H. B. GOODYEAR, OF NEW YORK, N. Y., ADMINISTRATOR OF N. GOODYEAR, DECEASED.

IMPROVEMENT IN MANUFACTURE OF HARD RUBBER.

Specification forming part of Letters Patent No. 8,075, dated May 6, 1851; Reissue No. 557, dated May 18, 1858.

DIVISION B.

*To all whom it may concern:*

Be it known that NELSON GOODYEAR, late of the city, county, and State of New York, now deceased, did, in his lifetime, invent a new and useful Improvement in the Preparation and Manufacture of Caoutchouc, and did thereby produce a new manufacture or substance, for which said invention Letters Patent of the United States were granted to the said NELSON GOODYEAR, bearing date the 6th day of May, 1851; that the said Letters Patent are believed to be inoperative by reason of a defective and insufficient description and specification, which defects and insufficiencies have arisen from inadvertence and mistake and without any fraudulent intention; and that the following is a full, clear, and exact description of the said new manufacture or substance, distinguishing it from all other things before known, and of the manner of making the same in such full, clear, and exact terms as to enable any one skilled in the art of vulcanizing india-rubber and other allied gums to make, produce, and use the same.

The invention of the said NELSON GOODYEAR relates to an improvement in the preparation of what is known as "vulcanizable" india-rubber and allied gums, described in Letters Patent reissued to Charles Goodyear on the 25th day of December, 1849, on the surrender of Letters Patent granted to him by the United States and bearing date the 15th day of June, 1844, by which said improvement a new substance is produced never before known, and applicable to purposes to which the products of the said Charles Goodyear's invention are wholly inapplicable. The object of the said NELSON GOODYEAR was to produce from india-rubber or other vulcanizable gums a substance or manufacture possessing properties suitable for making (by molding or otherwise) a great variety of articles used in the arts, and which, prior to his said invention, could only be wrought, at great expense, of ivory, bone, tortoise-shell, horn, whalebone, or other like substances. He was aware that by the vulcanizing process invented by and patented to Charles Goodyear on the 15th day of June, 1844, and reissued on an amended specification bearing date the 25th day of December, 1849, a new substance was produced by subjecting india-rubber or allied gums and sulphur (and occasionally other ingredients) in admixture to a high degree of artificial heat, and that this new substance so produced possessed, in addition to the valuable natural properties of the native gum or gums, improved new properties valuable in the arts; but, although many of these properties were considered by the said NELSON GOODYEAR important to be possessed by the material which he desired to produce, yet as the product of the invention of Charles Goodyear was soft and pliable, and only elastic when stretched or compressed, and although eminently useful for the uses contemplated by the inventor, Charles Goodyear—such as wearing-apparel, car and door springs, packing for steam-joints, &c., where pliability and its other qualities were important—it was obvious that it was wholly unsuited to the purposes contemplated by the said NELSON GOODYEAR, from the want of the hardness and beauty, when finished, of the ivory and the other substances named, and of the spring-like property under flexure peculiar to whalebone.

In view of the properties desired and the manner of production, the invention of the said NELSON GOODYEAR consists in the production of a new manufacture or artificial substance having the hard and tough properties found in various degrees in ivory, bone, tortoise-shell, and horn, and the spring-like property under flexure of whalebone, and which in the process of manufacture is plastic, so that it can be molded or modeled with facility into any desired shape, and which, when completed, may be wrought and polished to as high a degree as any of the native substances for which it is a substitute, which said manufacture or artificial substance is produced by the admixture of india-rubber or other vulcanizable gums and sulphur in the proportions of one pound of the gum to about from four ounces to a pound of sulphur, whether alone or with other substances, and then subjected to a high degree of heat, which should not be less than from 260° to 275° Fahrenheit's scale, during a period of six or more hours, or until the required degree of hardness has been obtained.

To enable any one skilled in the art of vulcanizing caoutchouc to produce the said manufacture or substance, I will describe the mode of procedure.

The india-rubber, or any of the allied gums, which are known to be vulcanizable by the before-named process of Charles Goodyear, is thoroughly mixed with sulphur, as for the well-known vulcanizing process, but in different proportions, as in the working of the said vulcanizing process of the said Charles Goodyear the best results are obtained by the use of the smallest proportional quantity of sulphur which will suffice to produce the change termed "vulcanization," and which is usually not over one ounce of sulphur to a pound of gum, while so small a proportional quantity of sulphur would entirely fail of producing the result obtained by the improved process of the said NELSON GOODYEAR. After the gum and sulphur have been thoroughly incorporated, and while the compound is in a plastic state, it may be rolled into sheets or put into any form desired by molding or otherwise, and then, whether in molds or otherwise, subjected to a high degree of heat, which should not be less than from 260° to 275° of Fahrenheit's scale in a steam or other heater, and kept there about six hours or more—that is, until the compound substance has attained the required degree of hardness. And although india-rubber or other allied gum and sulphur in suitable proportions will produce the new manufacture or substance suited to a great variety of purposes, and which will be capable of receiving the highest degree of polish, a still cheaper and for many purposes a better substance will be produced by the addition of other ingredients—such as magnesia, or lime, or the carbonate of magnesia or of lime, or the sulphate of magnesia or of lime, in which case the mixture may be made in the proportion of one pound of gum to half a pound of sulphur, and a half a pound of either of the other ingredients named, And in short, with the view to economy, and to vary the texture in degree, and to impart various colors, other ingredients may be incorporated, such as gum lack, (gum shellac,) rosin, oxides, or salts of lead or zinc, and other similar substances, whether mineral or vegetable. If gum lack be introduced, it should be in the proportion of from four to eight ounces to the pound of india-rubber or allied gum. The various additional or auxiliary ingredients only affect the product in degree, as the character of the new manufacture or substance is dependent upon the use of caoutchouc and a sufficient proportional quantity of sulphur, and a sufficiently high degree of heat continued long enough to induce the change indicated. And although much latitude may be taken in the proportial quantity of sulphur, a proportion much less than four ounces to the pound of caoutchouc will utterly fail to produce the new substance or manufacture hereinabove described.

I do not wish to be understood as making claim, broadly, to a manufacture or substance produced by the admixture of caoutchouc and sulphur, nor as making claim, broadly, to a manufacture or substance by subjecting the compound of caoutchouc and sulphur, whether with or without other substances, to a high degree of heat, as prior to the invention of the said NELSON GOODYEAR caoutchouc and sulphur had been compounded, and such compound alone, as well as with other ingredients, had been subjected to a high degree of heat, but not to produce the manufacture or substance having the character peculiar to the said manufacture or substance invented by the said NELSON GOODYEAR.

What is claimed as the invention of the said NELSON GOODYEAR, deceased, and desired to be secured by Letters Patent, is—

The new manufacture, or substance hereinabove described, and possessing the substantial properties herein described, and composed of india-rubber or other vulcanizable gum and sulphur in the proportions substantially such as described, and when incorporated subjected to a high degree of heat, as set forth, and this I claim whether other ingredients be or be not used in the preparation of the said manufacture, as herein described.

H. B. GOODYEAR,
*Administrator of Nelson Goodyear, deceased.*

Witnesses:
WM. H. BISHOP,
WM. C. BROWN.